United States Patent

[11] 3,556,448

| [72] | Inventor | Terry R. Dobbs |
| | | Orange, Calif. |
| [21] | Appl. No. | 709,267 |
| [22] | Filed | Feb. 29, 1968 |
| [45] | Patented | Jan. 19, 1971 |
| [73] | Assignee | Cargo Systems, Inc. |
| | | Orange, Calif. |
| | | a corporation of California |

[54] STRUCTURAL PANEL, AND PALLET FORMED THEREBY
16 Claims, 9 Drawing Figs.

[52] U.S. Cl. .................................................. 248/119,
52/309, 161/159, 248/361
[51] Int. Cl. ..................................................... B60p 7/08
[50] Field of Search ........................................... 248/119,
361; 108/51; 161/159; 105/369A; 52/309

[56] References Cited
UNITED STATES PATENTS
2,688,289  9/1954  Stenling ....................... 248/119

| 3,029,172 | 4/1962 | Glass ............................ | 161/159 |
| 3,090,406 | 5/1963 | Koppelman et al. ........... | 161/90 |
| 3,093,092 | 6/1963 | Martin et al. .................. | 105/369A |
| 3,339,326 | 9/1967 | Derr et al. ..................... | 52/309 |
| 3,428,002 | 2/1969 | McIntire et al. ............... | 108/51 |

Primary Examiner—Edward C. Allen
Attorney—Gausewitz & Carr

ABSTRACT: A structural panel in which expanded cores of acrylonitrile butadiene styrene resin are disposed between the flutes or webs of integrally woven three-dimensional fiberglass cloth. The cloth is impregnated with epoxy or polyester bonding resin, and is heat and pressure cured to form the panel. A surface coating of polyurethane resin is provided on the resulting cured product. The disclosure further relates to the combination of the panel with edge structures, including suitable fastener means, the result being a pallet for handling cargo in aircraft and the like.

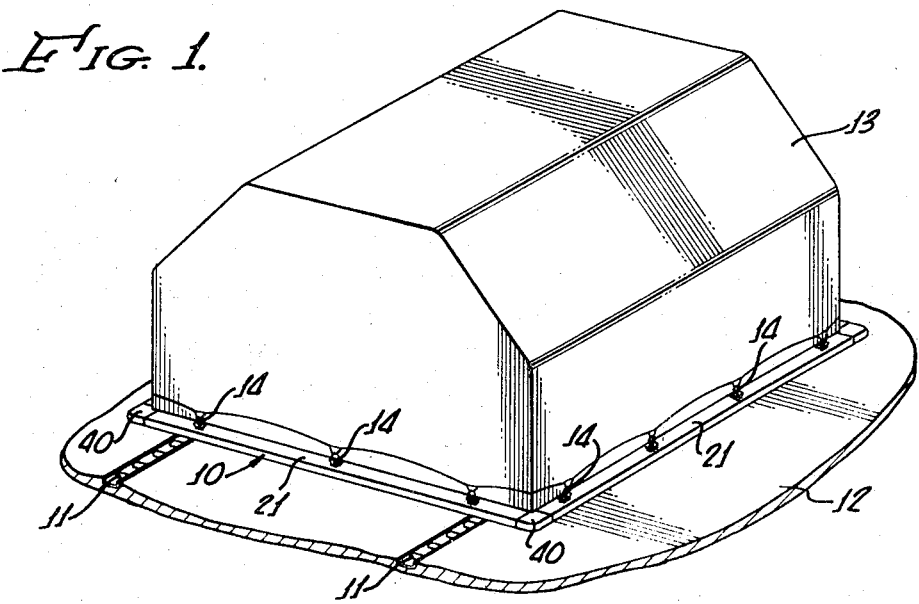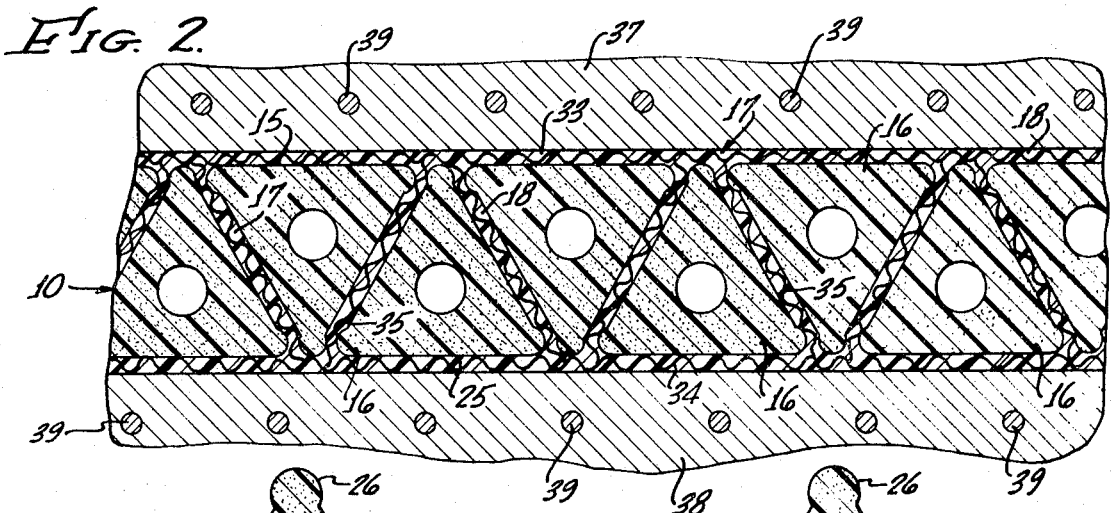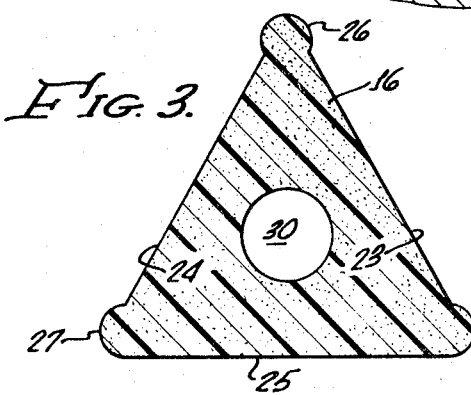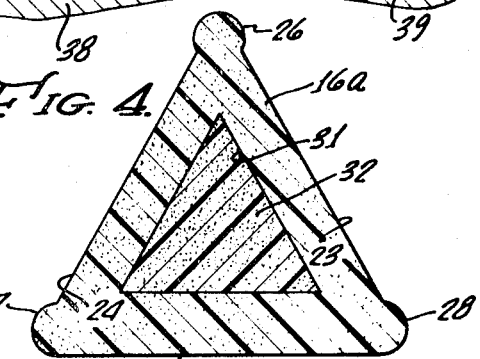

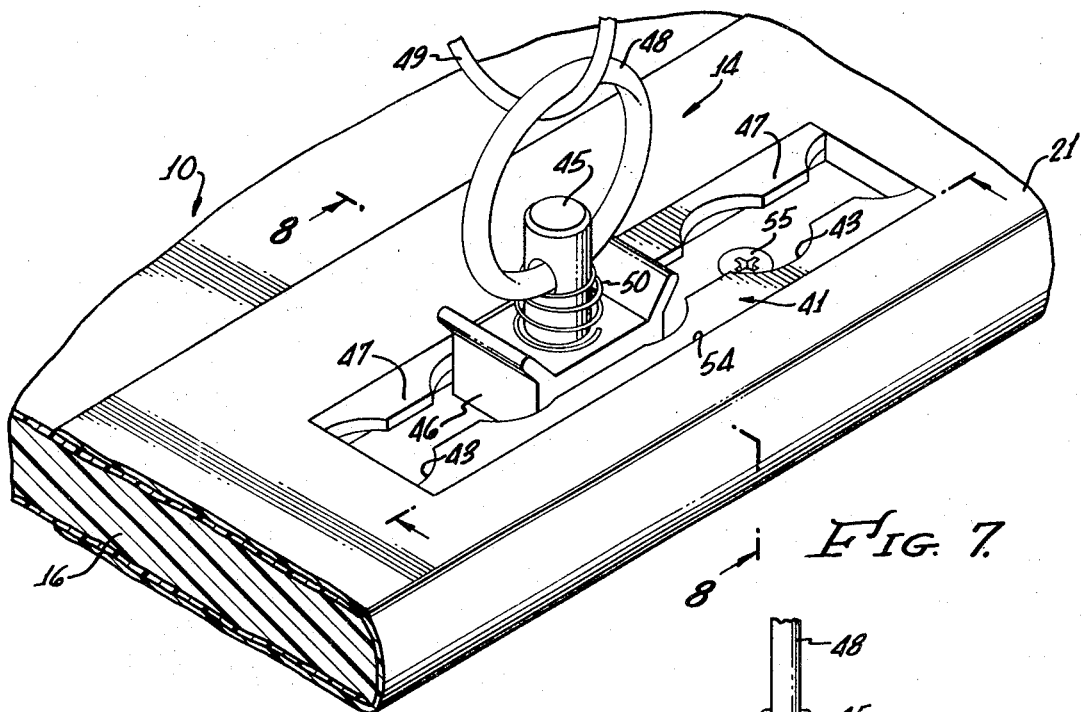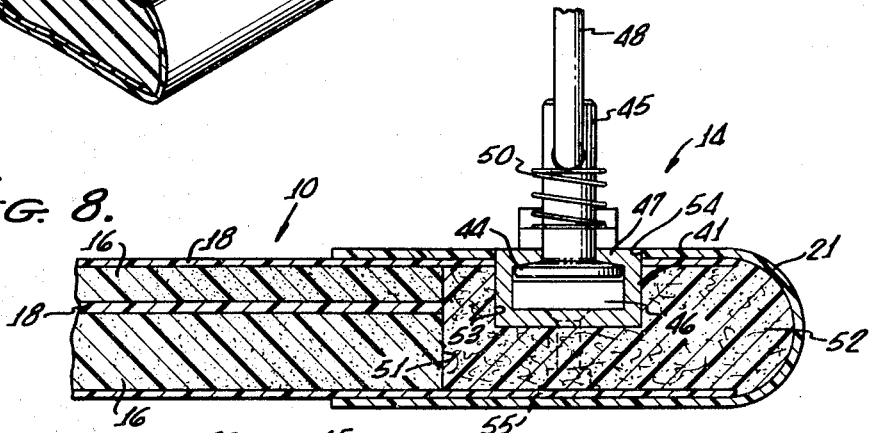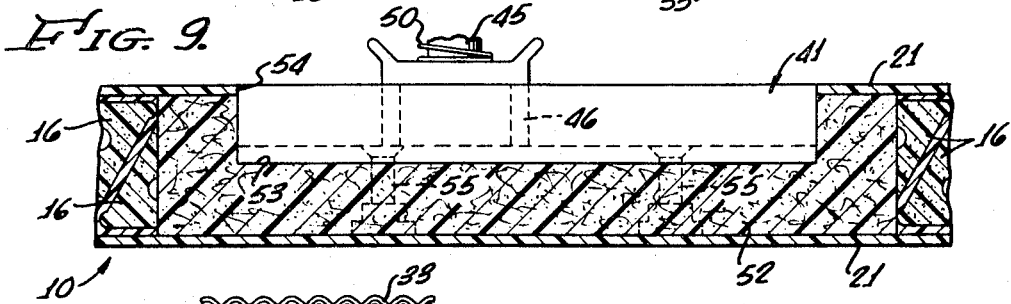

3,556,448

STRUCTURAL PANEL, AND PALLET FORMED THEREBY

BACKGROUND OF THE INVENTION

1. Field of the Invention

The invention relates to the field of structural panels, and more specifically to the field of pallets for supporting cargo in aircraft, trucks, etc.

2. Description of the Prior Art

Because the present disclosure in its more specific aspects relates to the field of pallets for handling cargo in aircraft, etc., the discussion of the prior art will be directed primarily to that field rather than to the entire field of structural panels.

Cargo pallets for aircraft are conventionally of two general types. The first type comprises a plywood core faced with oil-treated masonite and edged with aluminum extrusions. The second type includes a balsa wood core faced with plywood. "Formica," aluminum, steel or fiberglass. The edges of the second type are, again, aluminum extrusions.

The above-indicated and other cargo pallets are deficient in various respects, including the following:

1. The core materials of the pallets are not sufficiently tough and resilient to withstand adequately the impact, compressive, shear and deflective stress loads which are imposed.

2. The strength-to-weight ratios of the prior art pallets are insufficiently high, so that the pallets must be excessively heavy and thereby detract from the paying load contained in the aircraft.

3. The prior art pallets do not have the desired resistance to abrasion, crazing, ripping and tearing, nor do they have the desired resistance to weathering and chemical attack.

4. Various types of prior art face skins or facings, when employed in combinations with plywood or balsa wood cores, take on permanent sets when objects are dropped thereon. Accordingly, the surfaces of the pallets tend to become wavy or bumpy. Delamination of the face skins may start at such wavy or bumpy regions. Once delamination commences, the constant flexing of the pallets as they move across the ground-handling conveyor system causes progressive spreading of the delamination regions so that the skins or facings eventually separate from the cores. In this connection, it is to be noted that a glued or bonded flat surface has a very low resistance to peeling.

5. When the face skins of prior art aircraft cargo pallets are punctured, moisture is admitted into contact with the cores. This results in several major damage factors, including absorption of the water in the cores so that the weights of the pallets are substantially increased. The moisture also causes the layers of laminated material to separate, the final result being that the pallet may divide into various unusable components. With particular reference to cores formed of balsa wood, they are particularly subject to dry rot caused by moisture, the balsa then degenerating into powder so that the resistance of the pallet to loading is drastically reduced.

6. Prior art aircraft cargo pallets, whether punctured or otherwise, have outer skins which tend to fracture or crack. Such fracturing or cracking causes much damage to the pallet as it is loaded or as it rolls over the conveyor roller systems. With relation to fields other than that of pallets for use in aircraft or the like, it is known to provide panels formed of integrally woven fiberglass cloth containing very lightweight expanded resins (polyurethane foam) in the spaces between the ribs or flutes, the cloth being impregnated with epoxy resin, etc. However, such panels did not begin to have the strength, toughness, abrasion resistance, etc., required for uses such as aircraft cargo pallets.

SUMMARY OF THE INVENTION

According to the present invention, prior art cargo pallets for aircraft, and various other types of prior art panels used for structural and other purposes, are replaced by a pallet or panel wherein extruded cores of partially or moderately expanded acrylonitrile butadiene styrene (ABS) plastic are provided between the face skins and between the webs of integrally woven three-dimentional cloth formed of fiberglass or other fibrous reinforcing material. The cloth is impregnated with synthetic bonding resin, such as an epoxy or polyester, to make the entire structure rigid and to protect the ABS cores. There is thus provided a tough, resilient, unitary structure having great durability, a very high strength-to-weight ratio, a large modulus of elasticity, a high resistance to moisture, etc. The ABS cores are extruded in such shape that the synthetic bonding resin may penetrate into the regions between the cores, thereby achieving the maximum bonding and protective functions. Coatings of polyurethane, Teflon, etc., are provided over the faces of the panel to increase the resistance to wear, crazing, abrasion, and other forms of deterioration.

The extruded ABS cores have smooth outer skins and open centers. The interiors of the cores are closed cells surrounded by high-strength weblike structures. During curing of the bonding resin, which is accomplished under conditions of substantial heat and pressure, the ABS cores tend to expand further and thereby increase the strength and rigidity of the resulting panel.

In accordance with one important feature of the invention, each panel is formed into an aircraft cargo pallet by mounting fastener means and edging means about the periphery of a panel. Each fastener means is surrounded with a tough, hard backing preferably comprising synthetic bonding resin and fiberglass.

The resulting cargo pallet is relatively lightweight and is strong and rigid, having sufficient toughness and resilience to withstand severe loading, shocks and the like. The pallet is very resistant to wear and weathering, is not damaged by exposure to moisture, and is able to withstand stresses which would normally result in delamination in conventional pallets or panels. The stiffness-to-weight ratio of the pallet is such as to maintain the same flat under load, yet the resilience and impact resistance of individual portions of the pallet are sufficiently high to prevent damage thereto as a result of shocks and the like. The present pallet provides many times the use life of existing cargo pallets, and weighs far less.

BRIEF DESCRIPTION OF THE DRAWINGS

FIG. 1 is an isometric view illustrating a cargo pallet, constructed in accordance with the present invention, as supported on a typical roller-type conveyor construction, the pallet being loaded with freight which is contained within a suitable housing or "igloo;"

FIG. 2 is a greatly enlarged fragmentary sectional view illustrating a portion of the pallet as it is cured between heated platens;

FIG. 3 is an enlarged sectional view of one of the core elements of the present panel;

FIG. 4 is a sectional view corresponding to FIG. 3 but illustrating a second embodiment, wherein the core element is filled with lightweight foam material;

FIG. 5 is a fragmentary sectional view illustrating the three-dimensional integrally woven cloth structure which forms an important component of the present combination;

FIG. 6 is a fragmentary sectional view showing a coating as applied to the exterior surface or skin of the panel;

FIG. 7 is an isometric view of an edge portion of the panel, showing the combination of the panel with a fastener means for securing thereto an igloo, cargo webbing or other load-securing means;

FIG. 8 is a sectional view on line 8—8 of FIG. 7; and

FIG. 9 is a sectional view on line 9—9 of FIG. 7.

DESCRIPTION OF THE PREFERRED EMBODIMENTS

Referring to the drawings, the invention is illustrated as incorporated in a cargo pallet 10 such as may be employed to support cargo in aircraft, trucks, trains and the like. In FIG. 1, the pallet 10 is shown as resting on conveyor means in the form of rollers 11 mounted in a supporting surface or floor 12.

The illustrated rollers 11 are generally cylindrical in shape, but it is to be understood that they may be of various types (including, for example, ball-type rollers).

The cargo on pallet 10 is contained within an open-bottomed housing or "igloo" 13. Connector or fastener means 14, one form of which will be described in detail relative to FIGS. 7—9, are provided at spaced points along the edges of the pallet in order to removably secure the igloo thereto. It is pointed out that the igloo may be replaced by various other types of retaining means, for example strap webbing.

The components of the structural panel include core elements 16 which are permanently mounted within an integrally woven three-dimensional fabric 17, the fabric being impregnated with a bonding resin 18. For certain uses of the panel, at least one exterior face thereof is coated with a tough, protective resin represented at 19 in FIG. 6.

The panel formed by the elements 16—19 has a vast number of uses, many of which will be mentioned below. When the panel is employed to form the aircraft cargo pallet 10, the edges thereof are provided with channel-shaped edge elements 21 and also with the above-indicated connector or fastener means 14 for securing thereto the igloo 13 of other housing.

DETAILED DESCRIPTION OF THE STRUCTURAL PANEL PER SE

The core elements 16, which are of critical importance to the panel, comprise extrusions of acrylonitrile butadiene styrene (ABS) thermoplastic polymer. More specifically, the ABS is of a high-impact variety, a specific example of a preferred ABS being "Marbon-Cycolac X82," manufactured by the Marbon Chemical Division of Borg-Warner Corporation.

The ABS is expanded during the extrusion process, by incorporating a raising or blowing agent therein. The expansion is only of moderate degree (partial), however, particularly where high strength is required as in an aircraft cargo pallet. Thus, the density of the expanded "Marbon-Cycolac X82" core material which forms cores 16 is approximately 23—24 pounds per cubic foot.

The cores 16, during manufacture thereof, are formed by means of smooth walled extrusion dies, the result being that the surface or skin portions of each core are smooth and nonporous. The interiors of the cores are characterized by closed cell structure. Each cell (void) is surrounded by high-strength weblike portions of the ABS plastic.

Each of the cores 16 is generally triangular in cross-sectional shape, the triangles being equilateral. It is a feature of the invention, for reasons stated below, that two sides of each triangular core element are recessed or indented to form panels 23 and 24 (FIG. 3). The remaining core side, number 25, is not recessed but instead is flush with the adjacent edge portions of the extrusion.

The edge portions of the cores are not sharp but instead are rounded or radiused as indicated at 26—28, thereby increasing the strength and rigidity of the extrusion while eliminating any tendency toward cutting of the cloth 17.

As a specific example, which is given for purposes of illustration only and not limitation, the altitude of the triangle from side 25 to the opposite edge 26 may be 0.6 inch. The depression or recessing of each panel 23 or 24 below the adjacent edges may be on the order of 0.005 inch. Stated otherwise, the plane of panel 23 (for example) is spaced about 0.005 inch from a plane parallel thereto and tangential to both radiused edges 26 and 28.

A central or axial passage 30 is formed in each extruded core 16 to further reduce the weight thereof without substantially decreasing strength. In the above-stated specific example, the diameter of the passage may be about 0.125 inch.

Referring to FIG. 4, wherein is illustrated a modification 16a of the core 16 of FIG. 3, the central passage is shown as being enlarged to form a triangular passage 31 the walls of which are spaced equal distances from and parallel to the respective panels and sides 23—25. The passage 31 is filled with a highly expanded and extremely lightweight plastic, such as polyurethane foam 32. The foam 32, being expanded to a much greater degree than is the ABS forming the body of each core 16, provides a greater heat-insulating action. However, the strength of the core 16a is less than that of core 16 because of the increase in the size of the central passage.

Proceeding next to a description of the cloth or fabric 17, this is illustrated in FIG. 5 to be integrally woven and three-dimensional as previously indicated. The fabric has opposed parallel face or skin portions 33 and 34 which are integrally connected together by means of flutes or webs 35. In the illustrated construction, the flutes or webs lie in planes which are inclined relative to the planes containing skins 33 and 34. Triangularly sectioned passages 36 (FIG. 5) are thus defined for reception, respectively, of upright and inverted core elements 16 or 16a.

The cloth is preferably formed of fiberglass, although it is within the scope of the invention to employ other fabrics, including various types of metal fabrics. In addition, the cloth may be formed of graphite-impregnated fiberglass fibers, such fibers being characterized by a very high modulus of elasticity and by a low density in addition to having a high strength-to-weight ratio.

The fabric is shown in FIG. 5 in substantially its actual form (except for the thicknesses of the face portions), being described in much greater detail in U.S. Pat. Nos. 3,090,406 and 3,207,185, inventors E. Koppelman et al. In FIGS. 2 and 6 the cloth is indicated schematically, whereas in FIG. 8 and 9 it is not illustrated.

Instead of having flutes or webs which are inclined as shown, such flutes may be perpendicular to the planes of faces 33 and 34. In such case, the cores inserted therein would be correspondingly rectangular or square in section.

It is pointed out that the face portions 33 and 34 of the cloth may differ in thickness, not only from each other but also from the flutes 35. For example, the bottom face of the cloth (forming the bottom of the pallet) is actually much thicker than is the top face. Thus, the structure may be designed to meet varying types of stress and load conditions. Since the top and bottom faces are integrally woven as described, neither is of laminated construction.

The spacings between the opposed faces 33 and 34, and between adjacent webs, are such that a core 16 will be snugly received in each passage 36 (FIG. 5) prior to the bonding step next to be described.

By employing the integrally woven three-dimensional fabric, it is assured that the maximum resistance to delamination of the face or skin portions will be achieved. Furthermore, and especially where the bottom face is relatively thick, the strength and abrasion resistance of the pallet are maximized.

The bonding material 18 is, as previously indicated, a suitable synthetic bonding resin such as an epoxy or polyester. In accordance with one method of fabrication of the panel, the epoxy is applied to the fabric 17 after insertion of the cores 16 into the passages 36 between flutes 35. In accordance with another method of fabrication, the epoxy or other synthetic bonding resin is preimpregnated into the fabric prior to insertion of the cores.

Proceeding next to a description of the method of making the structural panel per se, the dimensional configuration of the panel is first established, following which the three-dimensional fabric 17 is woven in such manner as to satisfy the stress requirements of the panel. The number and arrangement of filaments in various portions of the cloth 17 are determined by the loom, which is programmed in accordance with the teachings of the above-cited patents, to provide the required strength and resistance to delamination or peeling, etc.

Assuming that in the present illustration the three-dimensional cloth 17 is not preimpregnated with synthetic bonding resin, the next step in the method comprises inserting the extruded cores 16 of expanded ABS thermoplastic into the respective passages 36 (FIG. 5) between adjacent flutes or webs 35. Alternate ones of the cores are thus inverted, as above indicated. Referring to FIG. 2, the orientation of the cores when inserted is such that the flat (not paneled) surfaces 25 thereof are adjacent the respective skin or face portions 33 and 34 of the fabric. It follows that the paneled regions 23 and 24 are adjacent the respective web or flute portions 35, there being a paneled region on each side of each web. Such recessed or paneled regions 23—24 permit flow of the synthetic bonding resin into the spaces between adjacent webs during subsequent steps of the method, so that there will be no voids in the finished panel.

The fabric 17 having the cores 16 inserted therein is then coated with a precalculated amount of the synthetic bonding resin and placed upon the platen of a press. The press platen is previously coated with a suitable resin-resistant parting agent to permit separation of the panel after completion of the method.

Pressure is then applied to the panel skin on the face thereof remote from the platen. The pressure should be on the order of 12 to 15 pounds per square inch, being applied by means of a vacuum bag, or by a hot platen press. When a vacuum bag is employed to apply the pressure, the resin system utilized should be such that a substantial amount of heat is generated as the resin polymerizes. When the pressure is applied by a hot platen press, a temperature on the order of 200° to 250° F. may be applied for approximately 30 minutes or for such other time period as is compatible with curing of the particular resin employed.

Referring to FIG. 2, the upper and lower platens of a hot platen press are indicated fragmentarily at 37 and 38. The heating wires which heat the platens are represented at 39.

The application of heat and pressure causes the bonding resin to flow into the spaces between adjacent cores 16, such flow being greatly facilitated by the presence of the recesses or panels 23 and 24. The result is that (1) all of the cloth fibers become embedded in the resin, and (2) the cores 16 are fully surrounded and protected by the resin and fibers. It follows that the cores 16 are prevented from being abraded, or from deteriorating in any way.

During appropriate hot curing of the bonding resin, at a sufficiently high temperature and for a time period of substantial duration, the partially expanded ABS cores 16 tend to expand further. Such tendency toward additional expansion of the cores 16 develops an internal pressure which results in stretching or stressing of the web portions 35 of the glass cloth. The strength values of the resulting panel are thereby rendered more favorable than would be the case if such tendency toward additional expansion were not present.

The resulting composite panel has very surprising properties relative to strength-to-weight ratio, resistance to abrasion and wear, toughness, durability and other factors. One reason for this is that the expanded ABS cores 16 are relatively resilient and do not disintegrate. It is emphasized, however, that the cores must be protected or they will disintegrate and will lack the necessary qualities of resilience, toughness, etc. The necessary protection is achieved by the combination of the synthetic bonding resin and the glass fiber, as indicated above.

As mentioned heretofore, and as indicated in FIG. 6, the next step in the method comprises the application of a tough and wear-resistant unfoamed coating 19 over the synthetic bonding resin 18. This coating is preferably a suitable polyurethane. With such a coating, even if wear on the panel eventually results in exposure of glass fibers, for example, there will be little or no serious crazing or wear, and no tendency for worn-away synthetic bonding resin to work its way into elements such as, for example, the rollers 11 indicated in FIG. 1.

It is pointed out that the panel may be mounted in a press, following which heat and substantial pressure are applied to force the skin portions closer together, thereby compressing the entire unit.

As a specific example of the finished panel per se, each of the cores 16 (or 16a, if a more insulating core is desired) may have the dimensions specified above. The thickness of the upper skin or face of the panel may be (including both the cloth and the adjacent resin) 0.040 inch, whereas that of the lower skin or face may be 0.050 inch. The thickness of each web may be (including the cloth webbing 35 and the bonding resin surrounding the same) 0.016 inch. The overall thickness of the panel is about 0.69 inch. As previously emphasized, these dimensions are specific examples, not limitations.

In addition to being employed as an aircraft cargo pallet, the above-described structural panel may be utilized for a wide variety of purposes. Some of such purposes are floors for aircraft structures; floors for containers; walls and/or ceilings for containers and other forms of structures; panels in truck trailer or railroad boxcars; molds and supporting forms for concrete work; chassis and other components of automobiles, farm and industrial equipment; and structural assemblies such as galleys, bathrooms, etc. The lightness, long service life, high impact resistance, toughness, high heat insulation characteristics, low water absorption, and high strength-to-weight ratio permit effective use of the panel in numerous structures additional to those enumerated above.

THE AIRCRAFT CARGO PALLET INCORPORATING THE ABOVE-DESCRIBED STRUCTURAL PANEL, AND METHOD OF MAKING THE SAME

Prior art cargo pallets for aircraft and the like relied primarily upon their edge braces to meet the "strong back" or rigidity requirements. The present structural panel, however, is so constructed that no such edge braces are necessary for purposes of creating rigidity and strength in the overall panel. However, the edges of the cargo pallet 10 are important for various reasons including the requirement for strong anchor portions adapted to connect to the igloo 13 or other associated cargo-securing means.

The edge means of the present cargo pallet 10 comprises the above-indicated channel-shaped edge elements 21 each of which may be, for example, an aluminum extrusion having a wall thickness of 0.050 inch. Each channel is preferably relatively deep, or hairpin-shaped, the base (web) portion being smoothly rounded.

Each edge channel 21 is suitably secured to an edge portion of the cargo pallet 10, for example by means of epoxy or polyester synthetic bonding resin. It is pointed out that the channels 21 need not be aluminum but may be, for example, formed of resin-impregnated glass cloth.

Suitable corner elements 40 (FIG. 1) are disposed at the ends of channels 21 and are adhesively mounted over the corners of the panel.

There will next be described one embodiment of a connector or fastener means 14 for securing igloo 13 to the pallet 10. The method of mounting each such connector means 14 to an edge of the pallet is important to the invention and will also be stated.

Each illustrated connector 14 is of a conventional type incorporating a track portion 41 having inwardly extending edges. Such edges are formed with longitudinally spaced arcuate notches 43 adapted to receive the disc-shaped end 44 of the spring-pressed plunger 45. An inverted U-shaped locking means is movably mounted around the plunger and has leg portions 46 which extend into the track when the disc-shaped end 44 is in locked position beneath the track portions 47 separating the notches. Thus, the device is mounted by pressing the disc-shaped end 44 into the track, while lifting upwardly on the U-shaped element having legs 46, and then sliding the device longitudinally of the track until the disc is beneath track portions 47. The U-shaped element is then released to cause the legs 46 to be in position to prevent further movement of the device longitudinally of the track.

A ring 48 is mounted through the upper end of each plunger 45 and receives therethrough the lower end of a securing means 49 (FIG. 7) for connecting the ring 48 with a lower edge portion of the open bottomed igloo 13. Ring 48 also serves as the seat for the helical spring (numbered 50) which normally holds plunger 45 in its elevated position.

To mount the tracks 41 and edge channels 21 at the edges of a previously formed structural panel, each panel edge is first rounded or radiused as shown. A router or similar apparatus is then employed to route out from between the face skins of the panel, but only at regions corresponding to each desired location of a track 41, all of the core material 16 and fabric webbing 35 described above. Thus, a rectangular cavity is formed, between the face or skin portions of the panel, at each desired track location. The bottom wall of one such cavity is numbered 51 in FIG. 8.

Each cavity thus formed is filled with a high-strength anchor material, preferably comprising a mixture 52 of synthetic bonding resin (epoxy or polyester) with chopped fiberglass cloth. After such resin-fiberglass compound has hardened, a mill or similar tool is employed to form recesses 53 in one face thereof, each recess corresponding to the shape and size of a track 41. The aluminum edge channels 21 are then mounted over the panel, having previously formed therein rectangular openings 54 which correspond in shape, size and location to the upper edge portions of tracks 41. The channels 21 are positioned with their openings registered with the previously milled recesses 53. Thereafter, the channels are secured in position by synthetic bonding resin as indicated above. The above-mentioned corners are then adhesively mounted at the channel ends.

The tracks 41 are then inserted through the openings 54 into the recesses 53. Suitable fastener means 55 are then extended through drilled holes in the anchor compound 52, in order to maintain tracks 41 securely in position despite the stresses resulting when the rings 48 are pulled by igloo 13 in response to gravitational or other forces. The fasteners 55 are preferably located completely beneath the channels 21 (between the flanges thereof), in order to prevent interference with rolling of the panel along its supporting rollers.

The described cargo pallet 10, including the edge means 21 and connector portions 14, is capable of withstanding severe stresses, shocks, impacts, etc., and is highly resistant to wear and deterioration. It is to be noted that the particular construction of the locking device 14 as such is not per se novel, the novelty instead residing in the manner of mounting the tracks 41 or equivalent mounting elements to the edge portions of the pallet 10.

The foregoing detailed description is to be clearly understood as given by way of illustration and example only, the spirit and scope of this invention being limited solely by the appended claims.

I claim:

1. A cargo pallet for aircraft and the like, which comprises:
   a structural panel adapted to support cargo, said panel comprising a multiplicity of elongated parallel core elements inserted, respectively, into openings between the webs of an integrally woven three-dimensional fabric, said core elements being formed of a high-strength partially expanded thermoplastic polymer, said polymer forming said core elements being partially expanded acrylonitrile butadiene styrene, the density of said partially expanded acrylonitrile butadiene styrene polymer being approximately 23—24 pounds per cubic foot, said panel further comprising synthetic bonding resin impregnated into said fabric and enclosing said core elements;
   edge means mounted about the edges of said panel and forming a frame therearound; and
   connector means secured to the edges of said panel for connection thereof to a cargo-retaining means.

2. A cargo pallet for aircraft and the like, which comprises:
   a structural panel adapted to support cargo, said panel comprising a multiplicity of elongated parallel core elements inserted respectively, into openings between the webs of an integrally woven three-dimensional fabric, said core elements being formed of a high-strength partially expanded thermoplastic polymer, said panel further comprising synthetic bonding resin impregnated into said fabric and enclosing said core elements;
   edge means mounted about the edges of said panel and forming a frame therearound; and
   connector means secured to the edges of said panel for connection thereof to a cargo-retaining means, said connector means including a portion recessed into an edge of said panel and secured to said edge by fastener means, said connector means further including a hard insert in said panel edge for reception of said connector portion and said fastener means, said connector means further including a connector element removably secured to said connector portion.

3. The invention as claimed in claim 2, in which said edge means comprises channel-sectioned aluminum extrusions mounted over the edges of said panel and secured thereto, said extrusions having openings therethrough registered with said connector portions.

4. The invention as claimed in claim 2, in which said insert is formed of chopped fiberglass and synthetic bonding resin.

5. The invention as claimed in claim 2, in which said polymer forming said core elements is expanded acrylonitrile butadiene styrene, in which said core elements are triangular in section, in which said fabric is an integrally woven fiberglass fabric having flutes or webs which define triangularly sectioned passages for reception of said core elements, and in which said synthetic bonding resin is selected from a group consisting of epoxy resins and polyester resins.

6. A cargo pallet for aircraft and the like, which comprises:
   a structural panel adapted to support cargo:
      said panel comprising a multiplicity of elongated parallel core elements inserted, respectively, into openings between the webs of an integrally woven three-dimensional fabric, each of said core elements being an extrusion formed of a high-strength partially expanded thermoplastic polymer, said polymer being acrylonitrile butadiene styrene, said extrusion having an axial passage therethrough, said panel further comprising synthetic bonding resin impregnated into said fabric and enclosing said core elements;
   edge means mounted about the edges of said panel and forming a frame therearound; and
   connector means secured to the edges of said panel for connection thereof to a cargo-retaining means.

7. The invention as claimed in claim 6, in which said axial passage is filled with a very low-density insulating foam plastic.

8. The invention as claimed in claim 7, in which said foam plastic is polyurethane foam.

9. A cargo pallet for aircraft, which comprises:
   a structural panel adapted to support cargo, and adapted to be shifted along roller-type support means, said panel comprising an integrally woven three-dimensional fabric having spaced-apart parallel faces integrally connected to each other by a multiplicity of webs, said panel further comprising a multiplicity of elongated extrusions of expanded acrylonitrile butadiene styrene polymer, said extrusions being snugly inserted in parallel relationship to each other and to said webs in the spaces formed between said faces and said webs, said panel further comprising synthetic bonding resin impregnated into said fabric and enclosing said core elements;
   edge means mounted about the edge portions of said panel and forming a frame therearound; and
   means to connect the edge portions of said panel to a cargo-retaining means.

10. The invention as claimed in claim 9, in which said extrusions of acrylonitrile butadiene styrene polymer are only partially expanded.

11. The invention as claimed in claim 9, in which one of said impregnated panel faces is substantially thicker than the other, each of said faces being integral and nonlaminated.

12. The invention as claimed in claim 11, in which the thickness of said thicker impregnated face is about 0.050 inch.

13. The invention as claimed in claim 9, in which a tough and wear-resistant coating of unfoamed polyurethane is provided exteriorly on at least the lower one of said faces, thereby insuring that any exposed fibers from said faces may not enter the rollers of said support means.

14. A cargo pallet for aircraft, which comprises:

a structural panel adapted to support cargo, and adapted to be shifted along roller-type support means, said panel comprising an integrally woven three-dimensional fiber glass fabric having spaced-apart parallel faces integrally connected to each other by a multiplicity of webs, said webs and faces defining triangularly-sectioned passages for snug reception of core elements, said panel further comprising a multiplicity of elongated extrusions of partially expanded acrylonitrile butadiene styrene polymer, each of said extrusions being triangular in section and being adapted to fit snugly into one of said triangularly sectioned passages, alternate ones of said extrusions being inverted whereby said extrusions nest together on opposite sides of said webs and between said faces, said panel further comprising synthetic bonding resin selected from a group consisting of epoxy resins and polyester resins, said bonding resin being impregnated into said fabric and enclosing said extrusions;

edge means mounted around the edge portions of said panel and forming a frame therearound; and connector means to connect said edge portions of said panel to a cargo-retaining means.

15. The invention as claimed in claim 14, in which one of said faces is formed of integrally woven fabric which is more thick than the other of said faces, both of said faces being non-laminated.

16. The invention as claimed in claim 14, in which an unfoamed polyurethane coating is provided exteriorly on at least one of said faces.